United States Patent
Kobayashi

(10) Patent No.: US 6,513,113 B1
(45) Date of Patent: Jan. 28, 2003

(54) ELECTRONIC INSTRUMENT ADAPTED TO BE SELECTIVELY BOOTED EITHER FROM EXTERNALLY-CONNECTABLE STORAGE UNIT OR FROM INTERNAL NONVOLATILE REWRITABLE MEMORY

(75) Inventor: Kazunori Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/333,666

(22) Filed: Jun. 16, 1999

(30) Foreign Application Priority Data

Jun. 19, 1998 (JP) ............................................ 10-172744

(51) Int. Cl.⁷ .............................................. G06F 12/00
(52) U.S. Cl. ............................ 713/2; 711/115; 711/103
(58) Field of Search ................................ 711/115, 103, 711/163; 713/1, 2, 310, 201, 163

(56) References Cited

U.S. PATENT DOCUMENTS

| | | | |
|---|---|---|---|
| 5,261,104 A | * 11/1993 | Bertram et al. ................. | 713/1 |
| 5,270,588 A | * 12/1993 | Choi ............................ | 326/101 |
| 5,361,358 A | * 11/1994 | Cox et al. ...................... | 713/1 |
| 5,452,454 A | * 9/1995 | Basu ............................. | 713/2 |
| 5,546,585 A | * 8/1996 | Soga ............................. | 713/2 |
| 5,764,593 A | * 6/1998 | Turpin et al. ................... | 713/2 |
| 5,822,582 A | * 10/1998 | Doragh et al. ............... | 709/321 |
| 5,987,605 A | * 11/1999 | Hill et al. ....................... | 713/2 |
| 6,079,016 A | * 6/2000 | Park ............................... | 713/2 |
| 6,112,302 A | * 8/2000 | Fujii et al. ...................... | 713/1 |
| 6,151,674 A | * 11/2000 | Takatani ........................ | 713/2 |
| 6,175,917 B1 | * 1/2001 | Arrow et al. ................... | 713/1 |

FOREIGN PATENT DOCUMENTS

| | | |
|---|---|---|
| JP | 6-222924 | 8/1994 |
| JP | 8-83175 | 3/1996 |
| JP | 9-258976 | 10/1997 |

* cited by examiner

Primary Examiner—Matthew Kim
Assistant Examiner—Pierre-Michel Bataille
(74) Attorney, Agent, or Firm—Oblon, Spivak, McClelland, Maier & Neustadt, P.C.

(57) ABSTRACT

An electronic instrument includes a connection detector detecting whether a connector is connected with an external storage unit, an operation unit, operated by an operator, outputting an operating signal having one of first and second states in accordance with an operation of the operator, a boot selection controller selecting a device to be booted from a nonvolatile rewritable memory and the external storage unit in accordance with a detection result of the connection detector and a state of the operation signal from the operation unit, and a determination unit whether the external storage unit stores a program when the external unit is selected as the device to be booted. The boot selection controller includes a first control unit selecting the external storage unit as the device to be booted when the external storage unit is connected to the connector and the operation unit outputs the operating signal having the first state; and a second control unit changing the device to be booted from the external storage unit to the nonvolatile rewritable memory when the determining unit determines that the external storage unit does not stores the program and the operation unit outputs the operating signal having the second state.

4 Claims, 13 Drawing Sheets

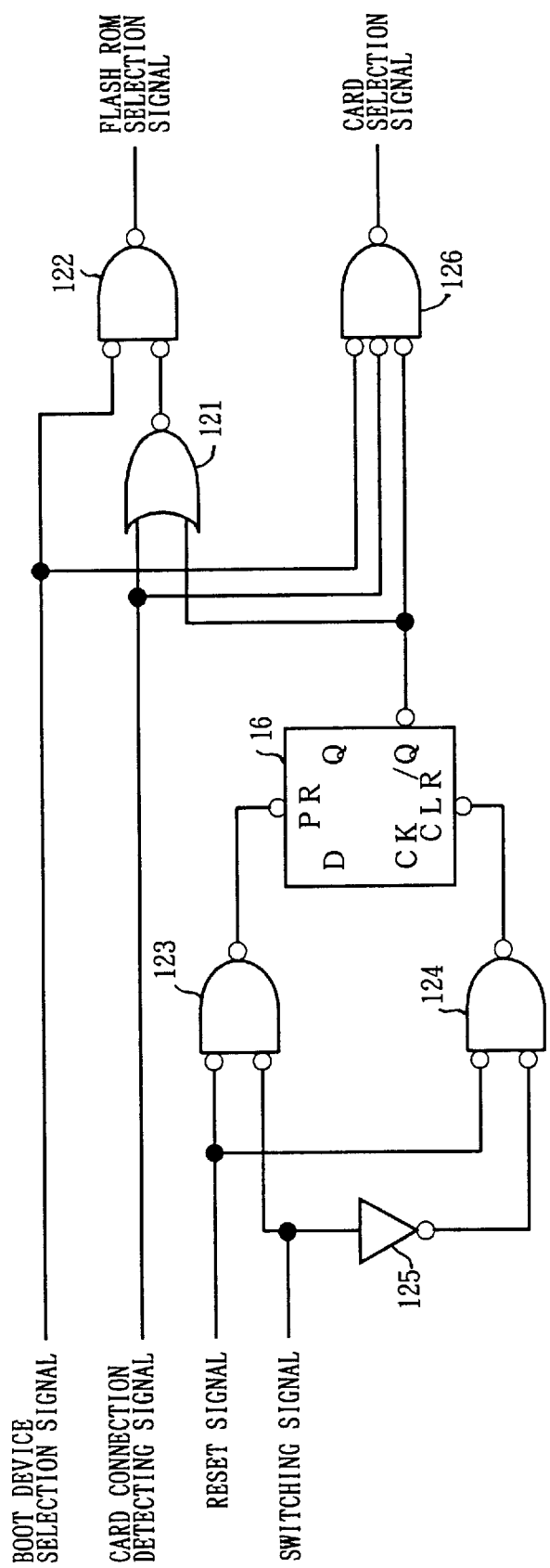
F I G. 6

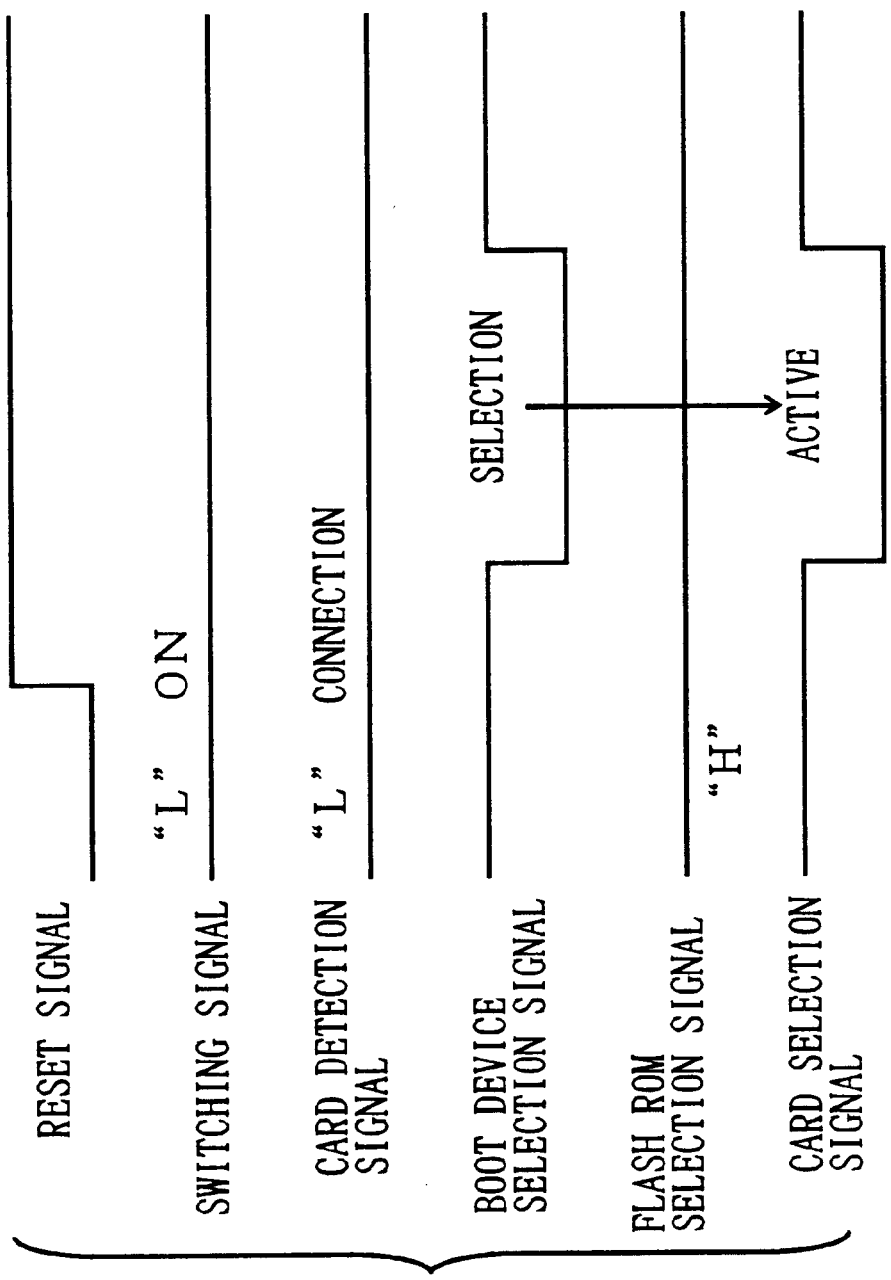
F I G. 7

ELECTRONIC INSTRUMENT ADAPTED TO BE SELECTIVELY BOOTED EITHER FROM EXTERNALLY-CONNECTABLE STORAGE UNIT OR FROM INTERNAL NONVOLATILE REWRITABLE MEMORY

BACKGROUND OF THE INVENTION

1. Field of the Invention

The present invention relates to an image forming apparatus such as a laser printer or a digital copy machine, and more particularly to an image forming apparatus controlled and operated in accordance with a program which is read out at the start of the operation.

2. Description of the Related Art

A conventional electronic instrument, such as an image forming apparatus having a nonvolatile memory (e.g. an EPROM or a ROM) which stores programs, such as control programs, used for image processing has been proposed. In the conventional electronic instrument, various processes are executed in accordance with the programs.

When the contents of the programs should be corrected because of defects such as bugs, the nonvolatile memory should be changed. In a work to change the nonvolatile memory, the apparatus has to be disassembled to be capable of changing the memory. Thus, a large amount of time is required for the work to change the memory.

In the recent years, to decrease the working time required to update the programs in the nonvolatile memory, it has been proposed that a flash ROM is used as the nonvolatile memory storing the programs. In order to update the programs, updated programs are down loaded from an external storage unit, such as an IC card, to the flash ROM. Thus, the working time required to update the programs can be greatly decreased.

For example, in an apparatus disclosed in Japanese Laid Open Patent Application No.8-83175, an external memory in which a control program for changing the contents in a flash memory and contents to be changed are stored is used. When the external memory is connected to a connector of the apparatus, addresses of the flash memory and the external memory are switched. The apparatus is then started up by the program in the external memory so that the contents in the flash ROM is changed.

In an apparatus disclosed in Japanese Laid Open Patent Application No.9-258976, two ROMs having the same capacity are provided. In each of the two ROMS, a down loading control program and a control program are stored. A chip select circuit is operated so that the control program in a ROM is changed by the down loading control program in another ROM. In addition, in an apparatus disclosed in Japanese Laid Open Patent Application No.6-222924, an address of a ROM detachable from the apparatus is specified by pull-down resisters or pull-up resisters connected to an address bus. A boot program in the ROM mounted in the apparatus is executed so that a control program supplied from an external unit is written in a flash memory. After this, the ROM is detached from the apparatus.

In addition, an IC card may be also used to supply an optional program and/or data to an apparatus having a flash memory. The optional program and/or data are added to a data table of a program stored in the flash memory so as to be used for an optional function of the apparatus. Due to change of the IC card, various optional programs and/or data may be used in the apparatus. In this case, a user can use various functions other than the standard specification.

In the conventional apparatus, the IC card is mainly used for the down loading operation to change a program stored in the flash ROM. When a connection of the IC card to the apparatus is detected, a boot process for the program stored in the IC card is executed so that the down loading operation is performed.

However, if an IC card storing an optional program and/or data as described above is connected the apparatus, when the connection of the IC card to the apparatus is detected, the optional program and/or data stored in the IC card is used to start the process. In this case, the apparatus is not started up and not operated by the program stored in the flash memory.

SUMMARY OF THE INVENTION

Accordingly, a general object of the present invention is to provide a novel and useful image forming apparatus in which the disadvantages of the aforementioned prior art are eliminated A specific object of the present invention is to provide an electronic instrument in which a process can be started even if an external storage unit (e.g., an IC card) storing any information (a program used by a processing unit to start the process, data, optional programs or the like) is connected to the instrument.

The above objects of the present invention are achieved by an electronic instrument having a nonvolatile rewritable memory in which a program is stored, a connector to which an external storage unit is connectable, and a processing unit which starts a process using a program stored in the nonvolatile rewritable memory or the external storage unit connected to the connector, the electronic instrument comprising: a connection detector detecting whether the connector is connected with the external storage unit; an operation unit, operated by an operator, outputting an operating signal having one of first and second states in accordance with an operation of the operator; a boot selection controller selecting a device to be booted from the nonvolatile rewritable memory and the external storage unit in accordance with a detection result obtained by the connection detector and a state of the operation signal from the operation unit so that the processing unit starts the process using the program stored in the booted device; and a determination unit whether the external storage unit stores a program to be used by the processing unit to start the process when the external unit is selected as the device to be booted, wherein the boot selection controller comprises: a first control unit selecting the external storage unit as the device to be booted when the connection detector detects that the external storage unit is connected to the connector and the operation unit outputs the operating signal having the first state; and a second control unit changing the device to be booted from the external storage unit selected by the first control unit to the nonvolatile rewritable memory when the determining unit determines that the external storage unit does not stores the program and the operation unit outputs the operating signal having the second state.

In the electronic instrument according to the present invention, if the external storage unit is connected to the connector, the operator operates the operation unit so that the operation signal having the first state is output by the operation unit. As a result, the first control unit of the boot selection controller selects the external storage unit as the device to be booted. In this case, if a program to be used by the processing unit to start the process is stored in the external storage unit, the processing unit starts the process using the program stored in the external storage unit. On the other hand, if a program to be used by the processing unit to start the process is not stored in the external storage unit, the determination unit determines that the external storage unit does not store the program to be used by the processing unit to start the process. In this case, if the operator operates the operation unit so that the operating signal having the second state is output by the operation unit, the booted device is changed from the external unit to the nonvolatile rewritable memory by the second control unit. As a result, the processing unit starts the process using the program stored in the nonvolatile rewritable memory.

Thus, the processor can start the process regardless of whether the external storage unit connected to the connector stores the program to be used by the processing unit to start the process or other information.

BRIEF DESCRIPTION OF THE DRAWINGS

Other objects, features and advantages of the present invention will be apparent from the following description when read in conjunction with the accompanying drawings, in which:

FIG. 6 is a circuit diagram illustrating a first example of a circuit structure of a boot selector unit provided in the main controller;

FIGS. 7–10 are timing chart illustrating signals supplied to the boot selector unit and generated by the boot selector unit;

DESCRIPTION OF THE PREFERRED EMBODIMENTS

A description will be given of embodiments of the present invention with reference to the drawings.

Figure 1:
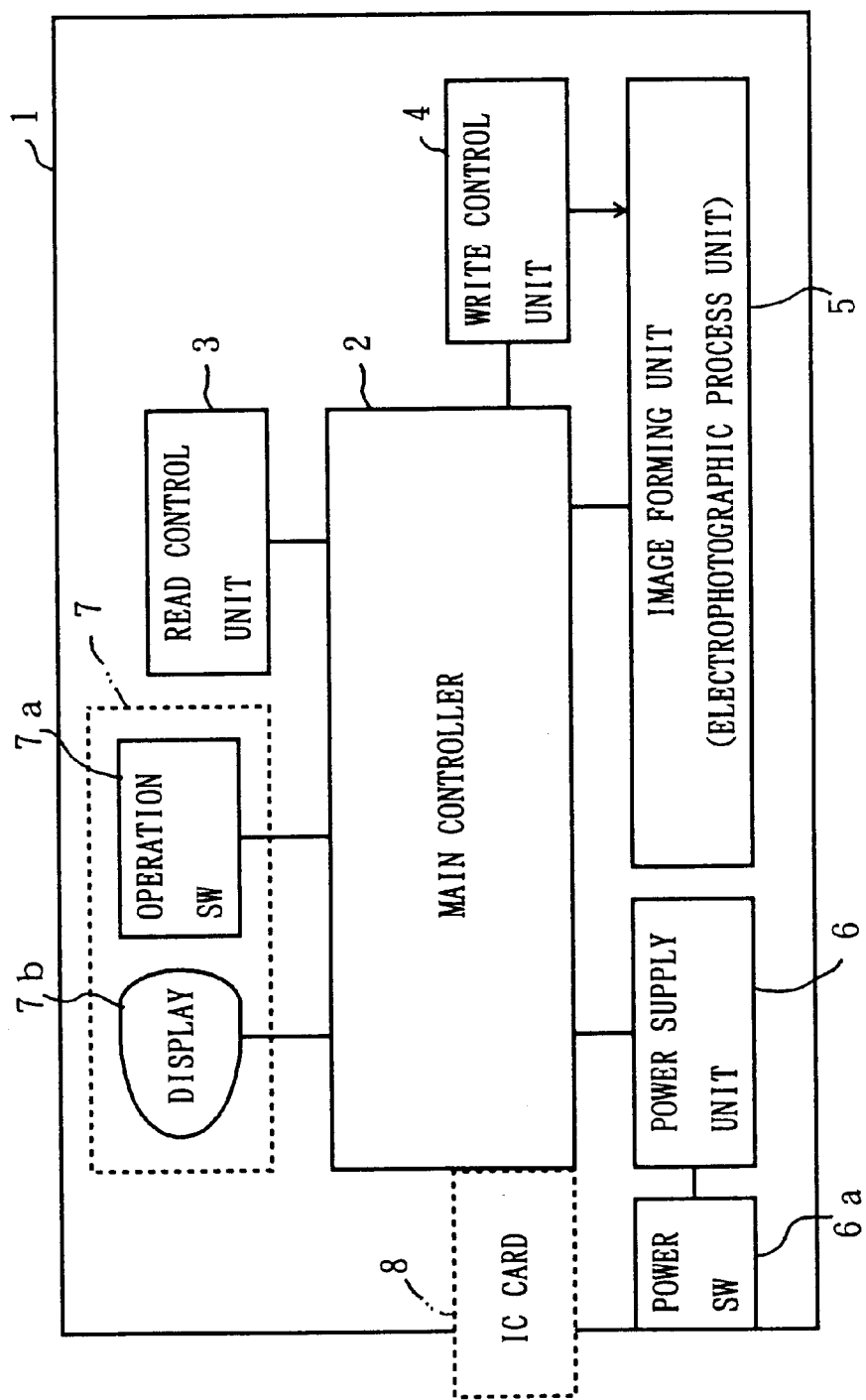
FIG. 1 is a block diagram illustrating a structure of a digital copy machine according to an embodiment of the present invention.

A digital copy machine which is an embodiment of the electronic equipment according to the present invention is formed as shown in FIG. 1. Referring to FIG. 1, the digital copy machine 1 has a main controller 2, a read control unit 3, a write control unit 4, an image forming unit (an electrophotographic process unit) 5, a power supply unit 6, a power switch 6a and an operation unit 7. The operation unit 7 includes a display device 7a and an operation switch 7b.

The read control unit 3 reads an original image and outputs image signals representing the original image. The image signals from the read control unit 3 are supplied to the main controller 2. The main controller 2 processes the image signals in accordance with predetermined programs. The processed image signal is supplied from the main controller 2 to the write control unit 4. The write control unit 4 converts the processed image signals into writing signals and supplies the writing signal to the image forming unit 5. The image forming unit 5 executes, using the writing signals from the write control unit 4, an electrophotographic process (including an electrostatic latent image forming process, a developing process, a transferring process and a fixing process) so that an image corresponding to the original image is formed on a predetermined medium (e.g., a recording sheet).

When the power switch 6a is turned on by an operator, the power supply unit 6 supplies an electric power to the main controller 2 and the other units.

Figure 2:
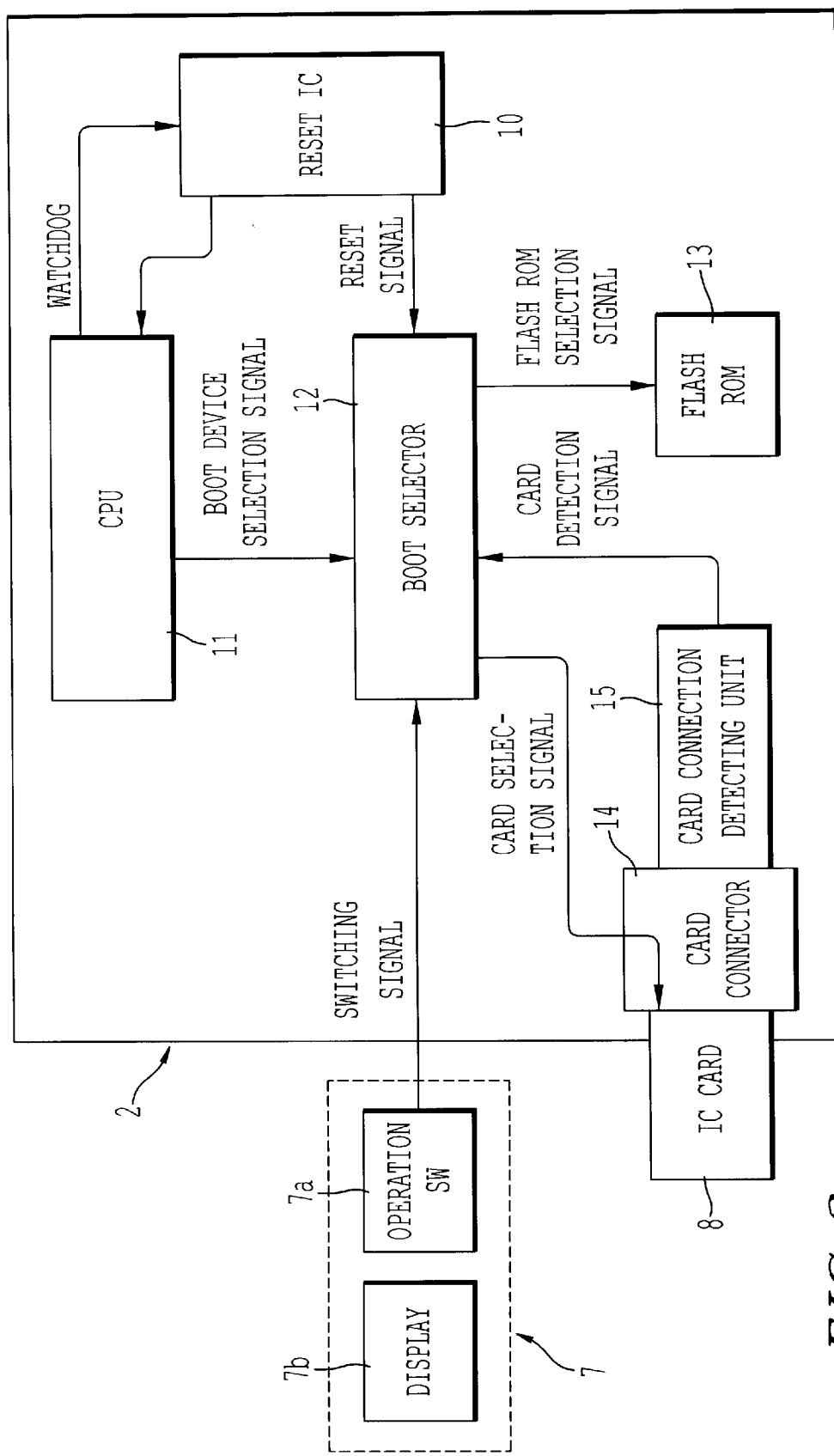
FIG. 2 is a block diagram illustrating an example of a structure of a main controller of the digital copy machine.

The main controller 2 is formed as shown in FIG. 2. Referring to FIG. 2, the main controller 2 has a reset IC 10, a CPU 11, a boot selector 12, a flash ROM 13, a card connector 14 and a card connection detector 15. An IC card 8 is capable of being connected to the card connector 14.

Figure 3A:
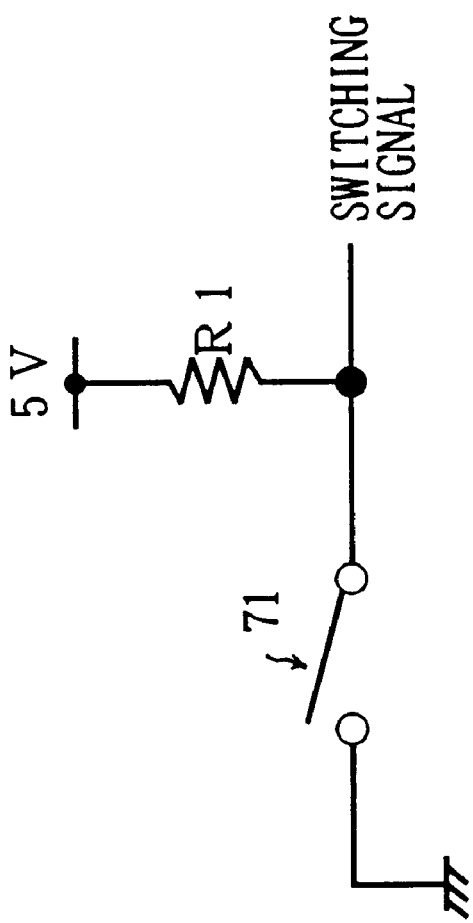
FIG. 3A is a circuit diagram illustrating an example of a structure of an operation switch provided in the digital copy machine.

The operation switch 7a which is operable by the operator outputs a switching signal having one of two states: an on state and an off state. The operation switch 7a is formed as shown in FIG. 3A. That is, the operation switch 7a has a switch device SW and a resistor R1 both of which are serially connected between a DC-power line (5V) and the ground (GND). The switching signal is output from a point at which the switch device SW and the resistor R1 are connected. The state of the switch signal is changed in accordance with the operation of the switch device SW as shown in FIG. 3A. When the switch device SW is opened, the switching signal is in the off state having a high level. When the switch device SW is closed, the switching signal is in the on state having a low level. The switching signal from the operation switch 7a is supplied to the boot selector 12.

Figures 4A, 4B:
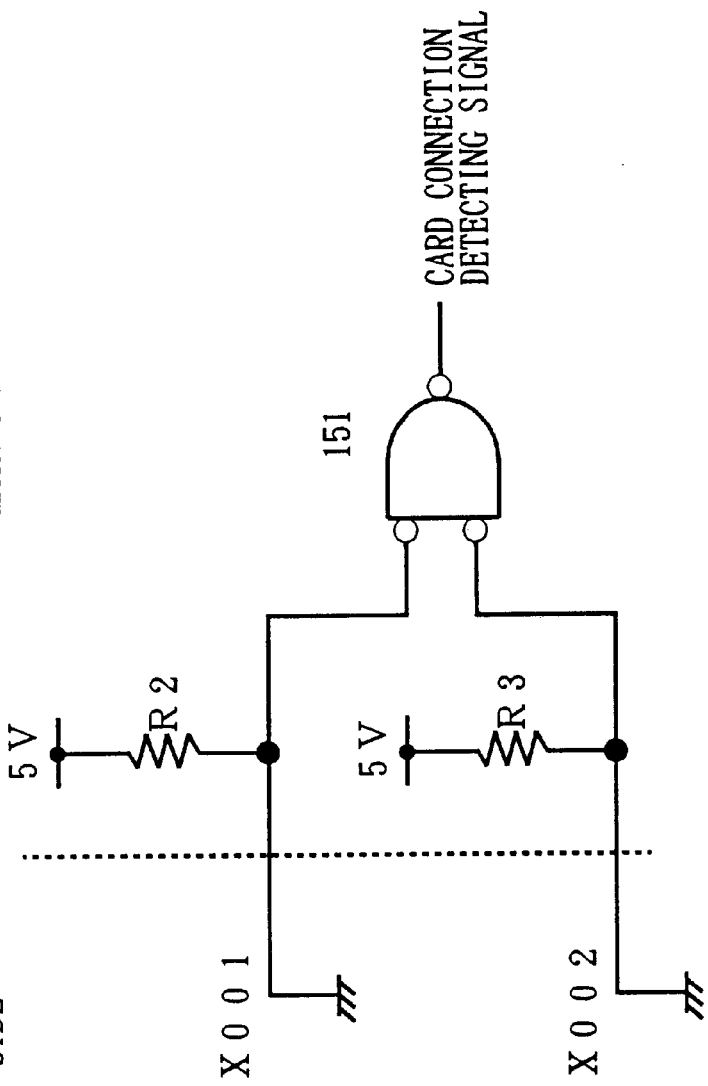
FIG. 4A is a circuit diagram illustrating a detecting circuit that outputs a signal indicating whether an IC card is connected to a main controller.
FIG. 4B is a timing chart illustrating the detecting signal output from the circuit shown in FIG. 4A.

The card connection detector 15 is formed as shown in FIG. 4A. Referring to FIG. 4A, ports X001 and X002 of the IC card 8 are grounded. A resistor R2 is connected to the DC-power line (5V) and a first connector pin to be connected to the port X001 of the IC card 8. A resistor R3 is connected to the DC-power line (5V) and a second connector pin to be connected to the port X002 of the IC card 8. The first and second connector pins are connected to input terminals of an AND gate 151 (a negative logic). The output of the AND gate 151 is a card connection detecting signal output from the card connection detector 15. The state of the card connection detecting signal is changed in accordance with whether the IC card 8 is connected to the card connector 14 as shown in FIG. 4B. When the IC card 8 is not connected to the card connector 14, the card connection detecting signal is in the off state having the high level. On the other hand, when the IC card 8 is connected to the card connector 14, the card connection detecting signal is in the on state having the low level. The card connection detecting signal output from the card connection detector 15 is supplied to the boot selector 12.

Figure 5:
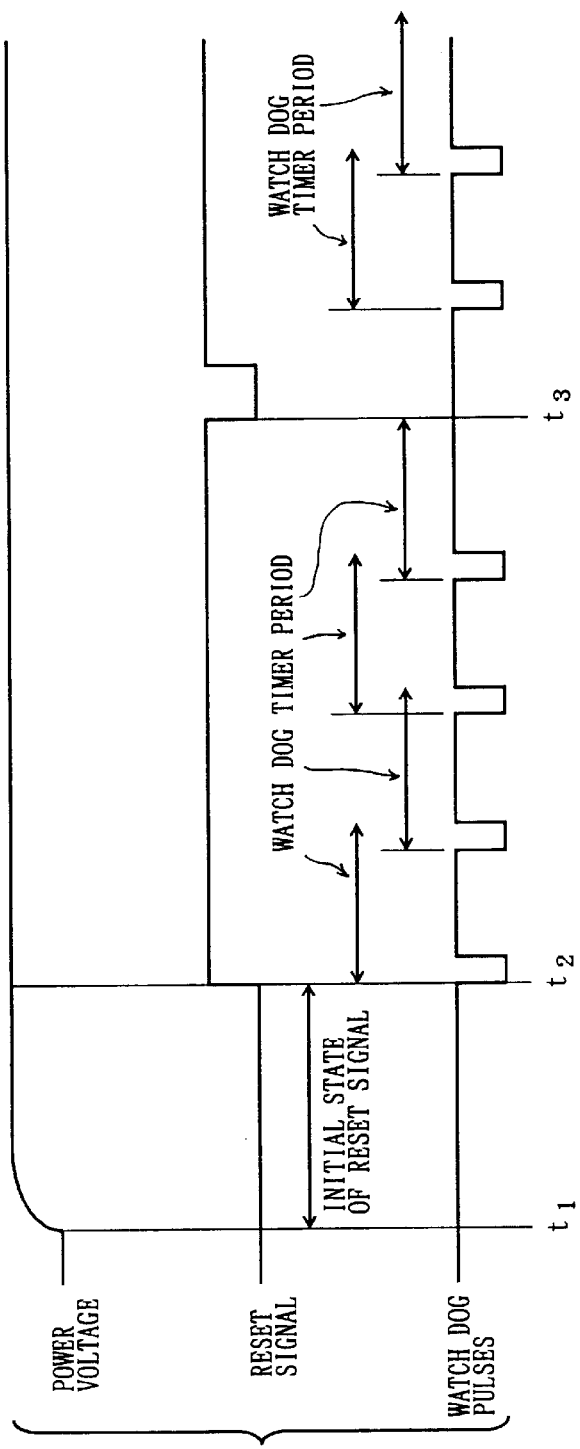
FIG. 5 is a timing chart illustrating an operation of a reset IC with a watch dog timer.

The reset IC 10 has a watch dog timer and receives watch dog pulses. The reset IC 10 outputs a reset signal as shown in FIG. 5. Until a predetermined time period elapses from a time t1 at which the power switch 6a is turned on, the reset IC 10 maintains the reset signal in an on state having a low level (an initial state). When the predetermined time elapses (at t2), the reset signal is turned off so as to have a high level. After this, while the CPU 11 is operating in a normal state, the watch dog timer is reset by the watch dog pulses received at predetermined intervals. In this state, the reset IC 10 maintains the reset signal in the off state. If a watch dog pulse is not received within the predetermined interval (a watch dog time period) because of an error in the CPU 11, the reset signal is turned on so that a reset pulse having the low level is generated (at t3).

The reset signal output from the reset IC 10 as described above is supplied to the CPU 11 and the boot selector 12. The CPU 11 is reset by the reset pulse of the reset signal.

Figure 3B:
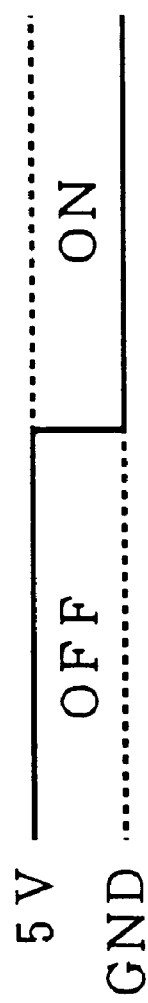
FIG. 3B is a timing chart illustrating a signal output from the operation switch.

The boot selector 12 is formed as shown in FIG. 6. Referring to FIG. 6, the reset signal output from the reset IC 10 as described above (see FIG. 5) is supplied to one of two input ports of an AND gate 123 and one of two input ports of an AND gate 124 in parallel. The switching signal from the operation switch 7*a* (see FIGS. 3A and 3B) is input to another one of the input ports of the AND gate 123. The output port of the AND gate 123 is connected to a preset terminal (PR) of a flip flop 16. The switching signal is supplied, via an inverter 125, to another one of the input ports of the AND gate 124. That is, an inverted signal of the switching signal is supplied to the AND gate 124. The output port of the AND gate 124 is connected to a clear terminal (CLR) of the flip flop 16. When the reset signal gets into the active state (having the low level) under a condition in which the switching signal is in the on state (having the low level), the flip flop 16 is preset by the output of the AND gate 123. When the reset signal gets into the active state (the reset pulse is generated) under a condition in which the switching signal is kept in the off state (having the high level), the flip flop 16 is cleared by the output of the AND gate 124. When the flip flop 16 is preset once, an inverted output signal /Q (/ means inversion) of the flip flop 16 gets into the active state having the low level and is kept in such a state unless the flip flop 16 is cleared.

After the power switch 6*a* is turned on, the CPU 11 outputs a boot device selection signal to the boot selector 12 at a predetermined timing. The boot device selection signal having a low level is valid. The boot device selection signal is input to one of input ports of an AND gate 122 and one of three input ports of an AND gate 126 in parallel. The AND gate 122 is controlled by an output of a NOR gate 121 having two input ports. The card connection detecting signal from the card connection detector 15 (see FIGS. 4A and 4B) and the inverted output signal /Q of the flip flop 16 are respectively input to the input ports of the NOR gate 121 so that the output of the NOR gate 12 depends on the card connection detecting signal and the inverted output signal /Q of the flip flop 16. Thus, when at least one of the card connection detecting signal and the inverted output signal /Q of the flip flop 16 is in an inactive state (having the high level), the AND gate 122 is controlled so that the boot device selection signal passes through the AND gate 122 and is output as a flash ROM selection signal. Otherwise, the output of the AND gate 122 is kept in an inactive state (having a high level).

The AND gate 126 is controlled by the card connection detecting signal and the inverted output signal /Q of the flip flop 16. When both of the card connection detecting signal and the inverted output signal /Q of the flip flop 16 are in the active state (having the low level), the AND gate 126 is controlled so that the boot device selection signal passes through the AND gate 126 and is output as an card selection signal. Otherwise, the output of the AND gate 126 is kept in an inactive state (having a high level).

The flash ROM selection signal output from the boot selector 12 (output from the AND gate 122) is supplied to the flash ROM 13 so that the flash ROM 13 is booted. The card selection signal output from the boot selector 12 (output from the AND gate 126) is supplied to the IC card 8 connected to the card connector 14 so that the IC card 8 is booted.

A description will now be given, with reference to FIGS. 7–11, a boot operation in the main controller 2.

In a first case where the IC card 8 storing programs to be executed by the CPU 11 is connected to the card connector 14, an operator carries out an on-operation of the power switch 6*a* while keeping the on-operation of the operation switch 7*a*. In this case, when the power switch 6*a* is turned on, the reset IC 10 outputs the reset signal which is in the active state under a condition in which the switching signal is in the on state. Thus, the flip flop 16 is preset so that the inverted output signal /Q gets into the active state (having the low level). In addition, since the IC card 8 is connected to the card connector 14, the card connection detector 15 outputs the card connection detecting signal which is in the on state (see FIG. 4A and FIG. 4B). In this state, when the CPU 11 outputs the boot device selection signal after the reset signal from the reset IC 10 is turned off, the boot device selection signal passes through the AND gate 126 and is output as the card selection signal as shown in FIG. 7. As a result, the card selection signal is supplied from the boot selector 12 to the IC card 8, so that the IC card 8 is booted. The CPU 11 then obtains the programs from the IC card 8 and executes the programs. If the IC card 8 stores a new program to be down loaded in the flash ROM 13, the new program is down loaded in the flash ROM 13. That is, the program in the flash ROM 13 is updated so as to be changed to the new program from the IC card 8.

Figure 8:
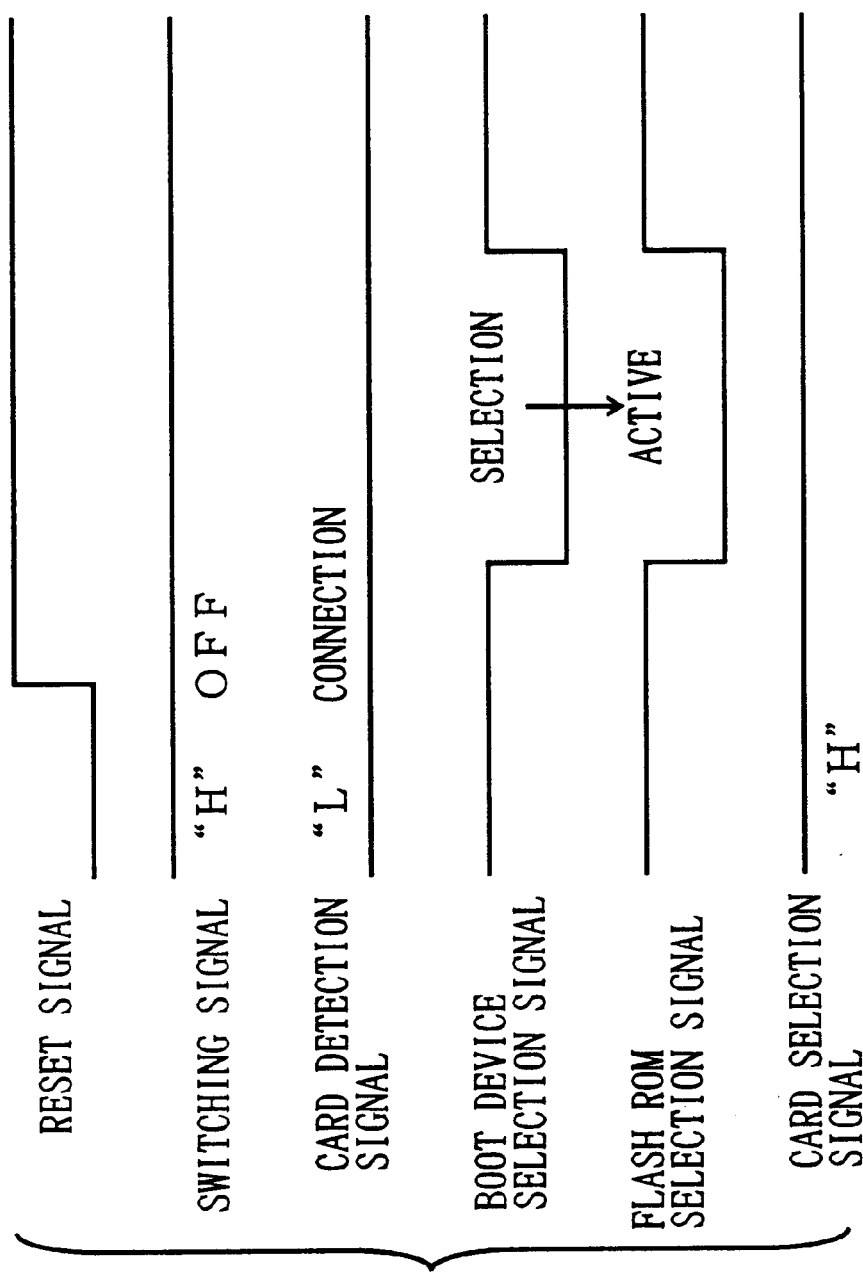

In a second case where the IC card 8 storing option programs and/or data required in processes executed by the CPU 11, the operator carries out the on-operation of the power switch 6*a* without the on-operation of the operation switch 7*a*. In this case, when the power switch 6*a* is turned on, the reset IC 10 outputs the reset signal which is in the active state under a condition in which the switching signal is in the off state. Thus, the flip flop 16 is cleared so that the inverted output signal /Q gets into the inactive state (having the high level). In addition, the card connection detector 15 outputs the card connection detecting signal which is in the on state in the same manner as in the first case. In this state, when the CPU 11 outputs the boot device selection signal after the reset signal from the rest IC 10 is turned off, the boot device selection signal passes through the AND gate 122 and is output as the flash ROM selection signal as shown in FIG. 8. As a result, the flash ROM 13 selection signal is supplied from the boot selector 12 to the flash ROM 13, so that the flash ROM 13 is booted. The CPU 11 then obtains the programs from flash ROM 13 and executes the programs. In the processes executed by the CPU 11, the option programs and/or the data stored in the IC card 8 are read out and used.

Figure 9:
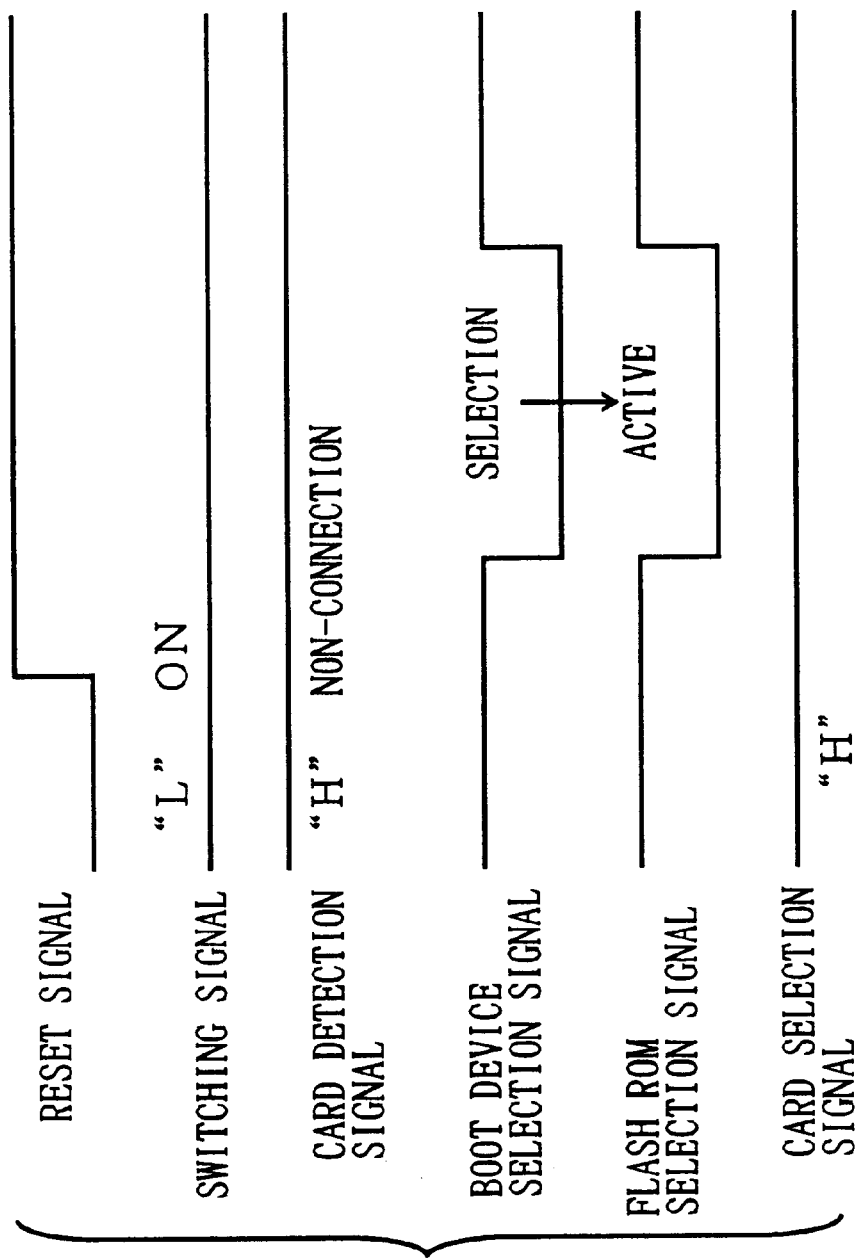

In a third case where the operator carries out the on-operation of the power switch 6*a* while keeping the on-operation of the operation switch 7*a* by mistake although the IC card 8 is not connected to the card connector 14, the IC card 8 is not booted. In this case, when the power switch 6*a* is turned on, the reset IC 10 outputs the reset signal which is in the active state under a condition in which the switching signal is in the on state. Thus, the inverted output /Q of the flip flop 16 is in the active state in the same manner as in the first case. However, the card connection detecting signal from the card detection detector 15 is in the off state (having the high level). In this state, when the CPU 11 outputs the boot device selection signal after the reset signal from the reset IC is turned off, the boot device selection signal does not pass through the AND gate 122, but passes through the AND gate 122 and is output as the flash ROM selection signal as shown in FIG. 9. As a result, the flash ROM 13 is booted by the flash ROM selection signal in the same manner as in the second case. The CPU 11 then obtains the programs from flash ROM 13 and executes the programs.

Figure 10:
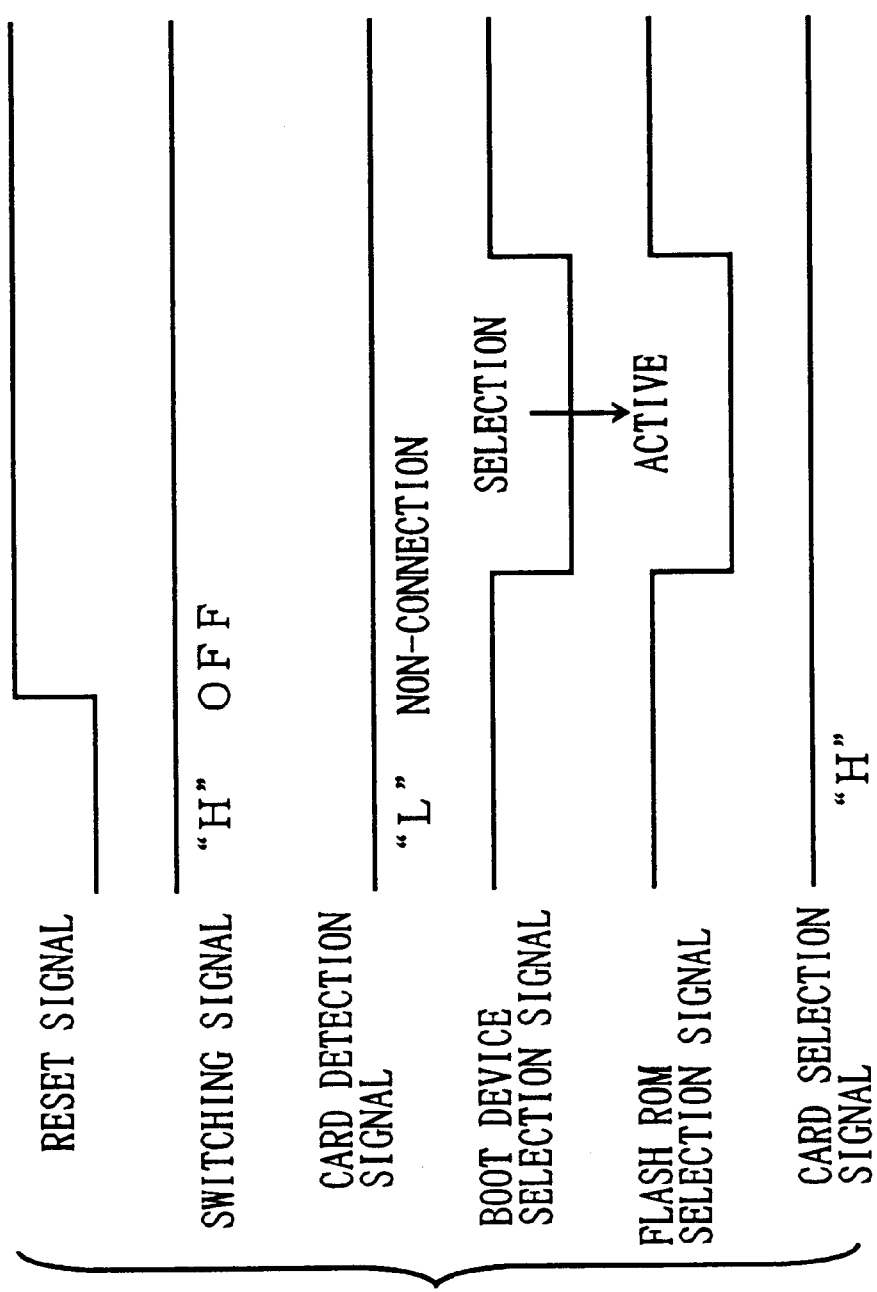

In a fourth case where the IC card 8 is not connected to the connector, the operator carries out the on-operation of the power switch 6a without the on-operation of the operation switch 7a. In this case, when the power switch 6a is turned on, the reset IC 10 outputs the reset signal which is in the active state under a condition in which the switching signal is in the off state. Thus, the inverted output signal /Q is in the inactive state (having the high level) in the same manner as in the second case. In addition, since the IC card 8 is not connected to the card connector 14, the card connection detector 15 outputs the card connection detecting signal which is in the off state (see FIG. 4A and FIG. 4B). In this state, when the CPU 11 outputs the boot device selection signal after the reset signal from the reset IC 10 is turned off, the boot device selection signal does not pass through the AND gate 126, but passes through the AND gate 122 and is output as the flash ROM selection signal as shown in FIG. 10. As a result, the flash ROM 13 is booted by the flash ROM selection signal. The CPU 11 then obtains the programs from the flash ROM 13 and executes the programs. If the IC card 8 stores a program to be installed in the flash ROM 13, the program is installed in the flash ROM 13. That is, the program in the flash ROM 13 is updated using the program from the IC card 8.

Figure 11:
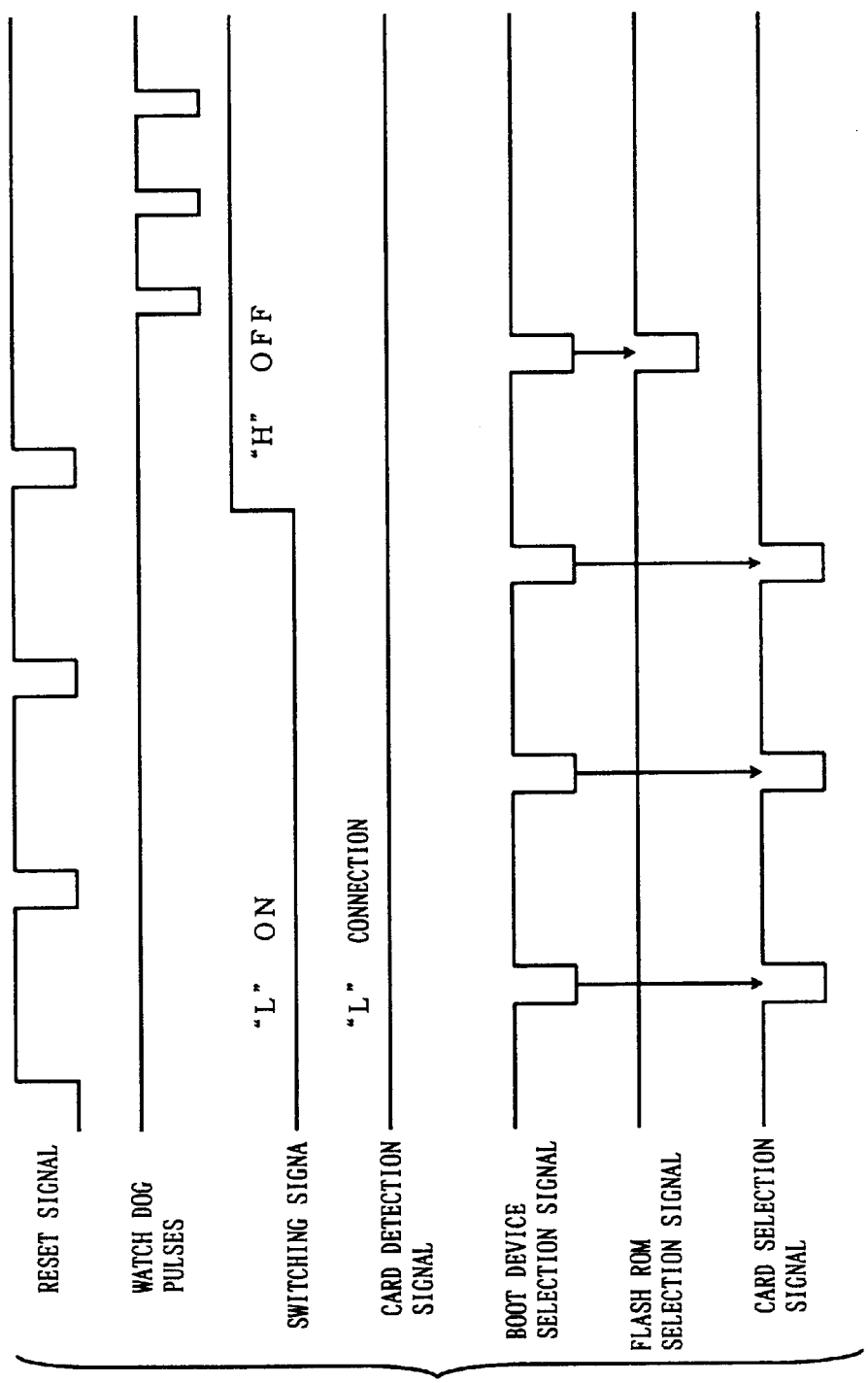
FIG. 11 is a timing chart illustrating a state of a transition from selection of the IC card to selection of a flash ROM in a case where the IC card storing no program is connected to the main controller.

In a fifth case, the operator carries out the on-operation of the power switch 6a while keeping the on-operation of the operation switch 7a under a condition in which the IC card 8 storing the option programs and/or data is connected to the card connector 14. In this case, the respective signals are varied as shown in FIG. 11. The IC card 8 is booted by the card selection signal based on the boot device signal from the CPU 11 in the same manner as in the first case. However, since the IC card 8 does not store the programs to be executed by the CPU 11, an error occurs in the CPU 11. The CPU 11 thus stops outputting the watch dog pulses, so that the reset IC 10 activates the reset signal (outputs a reset pulse). When the reset pulse is supplied from the reset IC 10 to the CPU 11 and the boot selector 12, the CPU 11 is reset and outputs the boot device selection signal at a predetermined timing. The IC card 8 is then rebooted by the card selection signal output from the boot selector 12 based on the boot device selection signal. However, the CPU 10 does not start a process. After this, since the above conditions of the operation switch 7a and the IC card 8 are maintained, the reset pulse is repeatedly output from the reset IC 10 to the CPU 11 and the boot selector 12. Every time the reset pulse is supplied to the CPU 11 and the boot selector 12, the CPU 11 outputs the boot device selection signal and the IC card 8 is booted by the card selection signal based on the boot device selection signal.

During the above operation in the main controller 2, the operator carries out the off-operation of the operation switch 7a. In this state, when the reset pulse is supplied to the boot selector 12, the flip flop 16 is cleared, so that the inverted output signal /Q gets into the inactive state. After this, when the CPU 11 which has been reset by the reset pulse outputs the boot device signal, the boot device signal does not pass through the AND gate 126, but passes through the AND gate 122 and is output as the flash ROM selection signal. As a result, the flash ROM 13 is booted by the flash ROM selection signal from the boot selector 12.

Thus, the CPU 11 obtains the programs from the flash ROM 13 which is booted and executes the processes in accordance with the programs. In the processes, the CPU 11 may use the option programs and/or the data stored in the IC card 8.

As has been described above, in a case where the IC card 8 storing programs to be executed by the CPU 11 is connected to the card connector 14, when the operator carries out the on-operation of the power switch 6a while keeping the on-operation of the operation switch 7a, the IC card 8 is booted and the CPU 11 executes the programs stored in the IC card 8 (the first case shown in FIG. 7). In a case where the IC card 8 is not connected to the card connector 14, when the operator carries out the on-operation of the power switch 6a without the on-operation of the operation switch 7a, the flash ROM 13 is booted and the CPU 11 executes the programs stored in the flash ROM 13 (the fourth case shown in FIG. 10). In a case where the IC card 8 storing no program to be executed by the CPU 11 (storing, for example, data other than the programs) is connected to the card connector 14, when the operator carries out the on-operation of the power switch 6a without the on-operation of the operation switch 7a, the flash ROM 13 is booted and the CPU 11 executes the programs stored in the flash ROM 13 (the second case shown in FIG. 8). In this case, during the process in accordance with the programs stored in the flash ROM 13, the CPU 11 may use the data stored in the IC card 8.

Further, even if the operator carries out the on-operation of the power switch 6a while keeping the on-operation of the operation switch 7a by mistake under a condition in which the IC card 8 is not connected to the card connector 14, the flash ROM 13 is booted and the CPU 11 executes the programs stored in the flash ROM 13 (the third case shown in FIG. 9).

In addition, in a case where the operator carries out the on-operation of the power switch 6a while keeping the on-operation of the operation switch 7a although the IC card 8 connected to the card connector 14 stores no program to be executed by the CPU 11, the IC card 8 is repeatedly booted. In this case, since the IC card 8 stores no program to be executed by the CPU 11, the CPU 11 is repeatedly reset. However, when the operator carries out the off-operation of the operation switch 7a, the flash RAM 13 is booted substituting for the IC card 8 and the CPU 11 executes the programs stored in the flash RAM 13 (the fifth case shown in FIG. 11).

Figure 12:
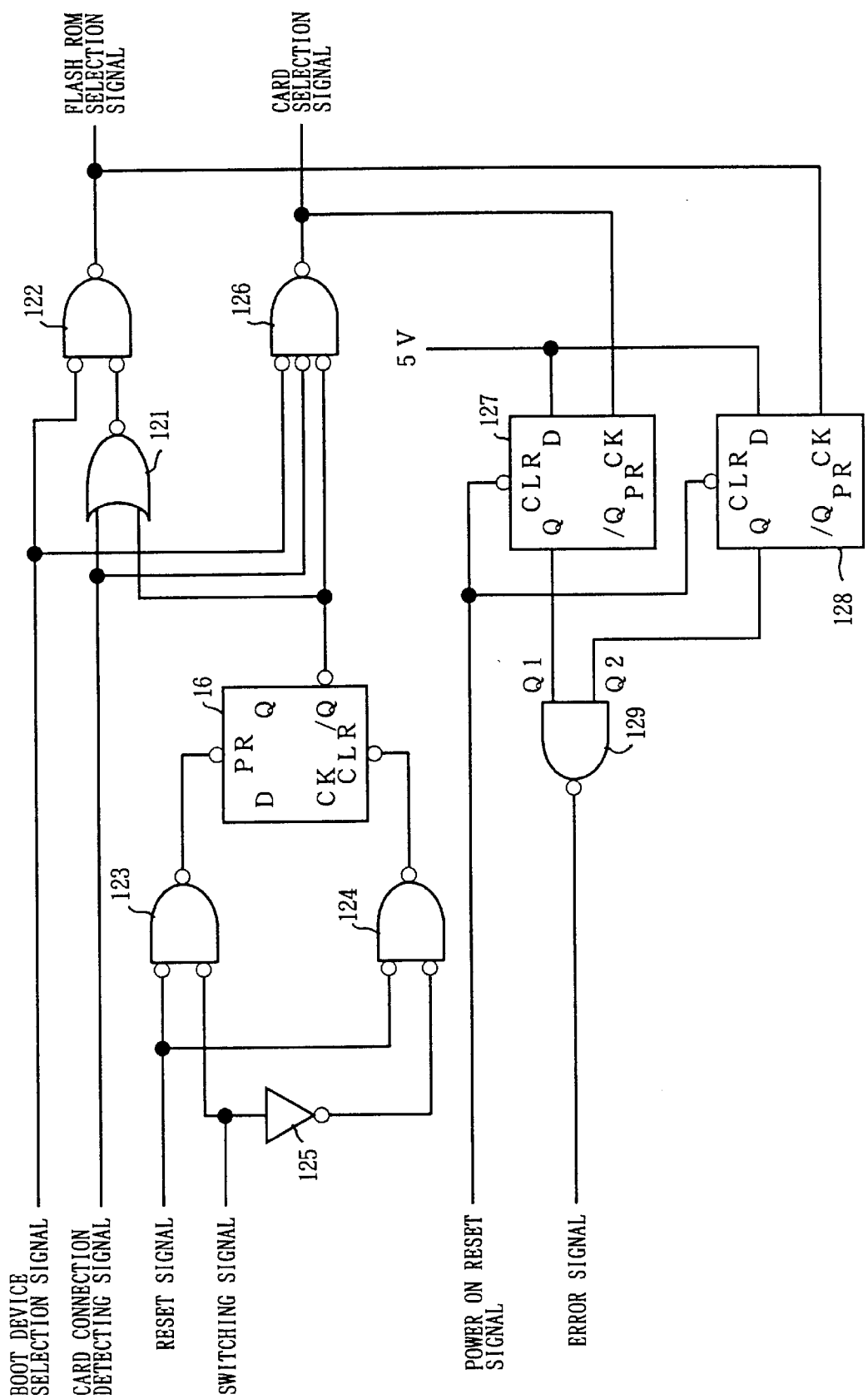
FIG. 12 is a circuit diagram illustrating a second example of the circuit structure of the boot selector unit.

The boot selector 12 may be also formed as shown in FIG. 12. In FIG. 12, those parts which are the same as those shown in FIG. 6 are given the same reference numbers.

Referring to FIG. 12, the boot selector 12 according to the present example has the AND gates 122, 123, 124 and 126, the flip flop 16, the NOR gate 121 and the inverter 125 in the same manner as that shown in FIG. 6. Thus, the boot selector 12 outputs the flash ROM selection signal or the card selection signal in accordance with the states of the reset signal, the switching signal, the card connection detecting signal and the boot device selecting signal in the same manner as in the above example shown in FIG. 6.

The boot selector 12 further has a flip flop 127, a flip flop 128 and a NAND gate 129. D-input ports of the flip flops 127 and 128 are connected to the DC-power line (5V) so as to be maintained at the high level. A clock port (CK) of the flip flop 127 is connected to the output of the AND gate 126 so as to be provided with the card selection signal. A clock port (CK) of the flip flop 128 is connected to the output of the AND gate 122 so as to be provided with the flash ROM selection signal. An output signal Q of the flip flop 127 is supplied to one (Q1) of two input ports of the NADN gate 129. An output signal Q of the flip flop 128 is supplied to another one (Q2) of the two input ports of the NAND gate 129. The output signal of the NAND gate 129 is used as an error signal for an error indicator (not shown). The error indicator may be a lamp, a display unit or the like.

A power-on reset signal is supplied to clear ports (CLK) of the flip flops 127 and 128. The power-on reset signal rises when the reset signal gets into the inactive state (having the high level) after the power switch 6a is turned on.

The boot selector 12 outputs the flash ROM selection signal and the card selection signal in the first through fifth cases (see FIGS. 7–11) as described above. When only either the flash ROM selection signal or the card selection signal is output (the first through fourth cases shown in FIGS. 7–10), the output signal Q of only one of the flip flops 127 and 128 is in the high level. Thus, the output of the NAND gate 129 is maintained at the high level (the inactive state). In this case, the error signal which is the output signal of the NAND gate 129 is in the inactive state, so that the error indicator is not activated.

Figure 13:
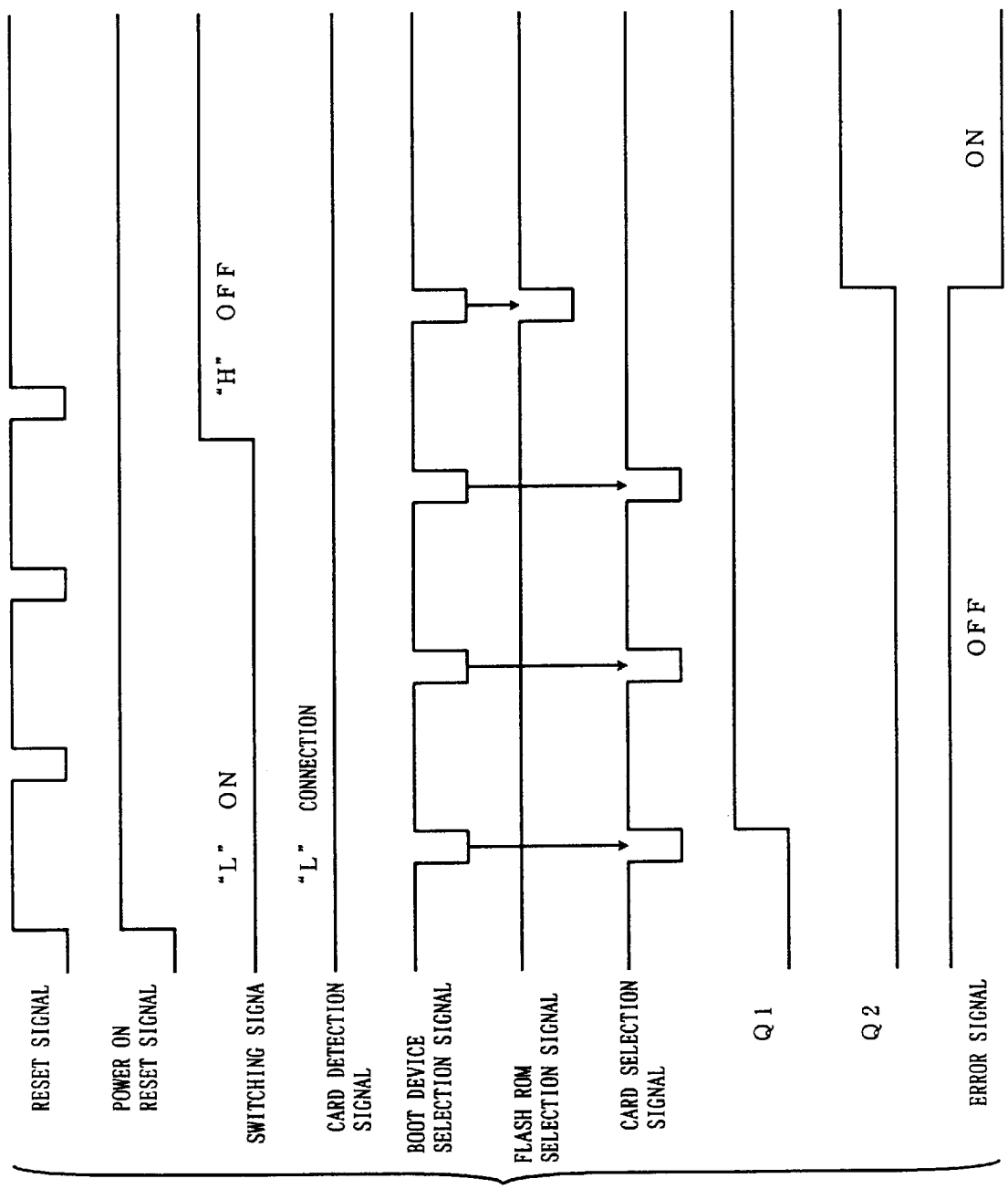
FIG. 13 is a timing chart illustrating signals supplied to the boot selector unit and generated by the boot selector unit.

On the other hand, in the above fifth case (see FIG. 11), after the IC card 8 storing no program to be executed by the CPU 11 is repeatedly booted by the card selection signal, the flash ROM 13 is booted by the flash ROM selection signal. In this case, as shown in FIG. 13, when the card selection signal is output first, the output signal Q of the flip flop 127 rises, that is the input Q1 of the NAND gate 129 rises to the high level. The input Q1 of the NAND gate 129 is then maintained at the high level. In this state, when the flash ROM selection signal is output, the output signal Q of the flip flop 128 rises, that is, the input Q2 of the NAND gate 129 rises. At this time, the error signal which is the output of the NAND gate 129 gets into the active state (having the low level). The error indicator is activated by the error signal so as to provide an error indication (the lamp is turned on, an error message is displayed, or the like).

The user who looks the error indication can know that the process was not started in accordance with information stored in the IC card 8 for same reason although the operation switch 7a was operated but has been started in accordance with the program stored in the flash ROM 13.

The present invention is not limited to the aforementioned embodiments, and other variations an modifications may be made without departing from the scope of the claimed invention.

For example, other external storage units, such as a ROM card, a floppy disk and the like may be substituted for the IC card 8 as described above. A functional key or switch for another function may be used also as the operation switch 7a. Further, the present invention may be applied to electronic instruments, such as personal computers, computer controllable home electronic instruments, computer controlled office machines and the like, other than the digital copy machine as described above.

What is claimed is:

1. An apparatus for forming images on paper sheets, the apparatus comprising:

a) an image forming unit configured to form images on paper sheets;

b) a central processing unit (CPU) configured to be booted based on a boot program stored in a selected boot device, and to control an operation of the image forming unit;

c) a flash memory configured to store executable programs that are executable by the CPU;

d) a connector configured to receive an IC card;

e) an IC card detecting unit configured to assert a detection signal in response to an insertion of the IC card into the connector;

f) an operation unit configured to assert a selection signal in response to a user operation of the operation unit; and g) a boot selector configured to select either (1) the IC card or (2) the flash memory, as the selected boot device, wherein:

1) the boot selector is configured to select the IC card as the selected boot device, in response to a concurrent assertion of the detection signal and the selection signal; and 2) the boot selector is configured to select the flash memory as the selected boot device, absent the concurrent assertion of the detection signal and the selection signal.

2. The apparatus of claim 1, further comprising:

a determination unit configured to determine whether the IC card stores a boot program.

3. The apparatus of claim 2, wherein:

the CPU provides watch dog pulses when the CPU is error free; and the determination unit includes a reset unit configured to monitor for the watch dog pulses, and, when the watch dog pulses are not being provided, to output a reset signal to (1) the CPU, to reset the CPU, and (2) the boot selector, so that the boot selector determines that the IC card does not store the boot program.

4. The apparatus of claim 1, further comprising:

an error signal output unit configured to output an error signal when the boot selector changes the selected boot device from the IC card to the flash memory.

* * * * *